(12) United States Patent
Kulczyk

(10) Patent No.: US 6,425,687 B1
(45) Date of Patent: Jul. 30, 2002

(54) COLD JUNCTION COMPENSATION FOR MULTIPLE THERMOCOUPLES

(75) Inventor: Wojciech K. Kulczyk, Surrey (GB)

(73) Assignee: Solartron Group Limited, Farnborough (GB)

( * ) Notice: Subject to any disclaimer, the term of this patent is extended or adjusted under 35 U.S.C. 154(b) by 0 days.

(21) Appl. No.: 09/465,013

(22) Filed: Dec. 16, 1999

(30) Foreign Application Priority Data

Dec. 16, 1998 (GB) ............................... 9827697

(51) Int. Cl.[7] ............................. G01K 3/02; G01K 7/02
(52) U.S. Cl. .................. 374/115; 374/179; 374/166; 374/181
(58) Field of Search ............... 374/115, 166, 374/179, 181, 152, 110

(56) References Cited

U.S. PATENT DOCUMENTS

| | | | | |
|---|---|---|---|---|
| 1,327,800 A | * | 1/1920 | Beighlee | 374/181 |
| 1,985,967 A | * | 1/1935 | Wunsch | 374/115 |
| 3,053,091 A | * | 11/1962 | Braunagel | 374/115 |
| 3,911,745 A | * | 10/1975 | Erhardt | 374/181 |
| 4,130,019 A | * | 12/1978 | Nitschke | 374/110 |
| 4,186,605 A | * | 2/1980 | Bourigault | 374/115 |
| RE30,735 E | * | 9/1981 | Ihlenfeldt | 374/181 |
| 4,583,867 A | | 4/1986 | Gautheret | |
| 4,624,582 A | | 11/1986 | Banda et al. | |
| 4,776,706 A | * | 10/1988 | Loiterman et al. | 374/208 |
| 5,046,858 A | | 9/1991 | Tucker | |
| 5,106,203 A | | 4/1992 | Napoli et al. | |
| 5,161,893 A | * | 11/1992 | Shigezawa et al. | 374/181 |
| 5,261,747 A | * | 11/1993 | Deacutis et al. | 374/137 |
| 6,188,971 B1 | * | 2/2001 | Kelly | 702/130 |

FOREIGN PATENT DOCUMENTS

| | | | | |
|---|---|---|---|---|
| FR | 2 382 000 | | 2/1978 | |
| GB | 1258645 | | 12/1971 | |
| JP | 0025683 | * | 2/1977 | 374/115 |

* cited by examiner

Primary Examiner—Diego Gutierrez
Assistant Examiner—Lydia M. De Jesús
(74) Attorney, Agent, or Firm—Nixon & Vanderhye P.C.

(57) ABSTRACT

A system for measuring average temperature including a plurality of measurement thermocouples (10,12,14) connected in parallel to measurement apparatus (24) by two signal wires (22) of a material different to that of the measurement thermocouples (10,12,14). Compensation thermocouples (26,28,30) are located at the cold junctions (16,18,20) of the measurement thermocouples (10,12,14) and connected to the measurement apparatus (24).

11 Claims, 2 Drawing Sheets

COLD JUNCTION COMPENSATION FOR MULTIPLE THERMOCOUPLES

BACKGROUND OF THE INVENTION

1. Field of the Invention

The present invention relates to a system for cold junction compensation for a plurality of thermocouples.

2. Discussion of Prior Art

In some applications, such as temperature measurement in aero engines, the temperatures to be measured are in excess of those which can be tolerated by conventional NiCr/NiAl thermocouples (commonly referred to as K-type thermocouples). The total gas temperature (TGT) inside some new jet engines is above 1200° C. which is above the reliable operating limit for a K-type thermocouple. Because of this it is desirable to fabricate thermocouples for such high temperature applications from Platinum and Platinum-Rhodium (Pt/PtRh—commonly referred to as R-type thermocouples although other reference symbols are sometimes used). Such thermocouples have a much higher tolerance to high temperatures.

A thermocouple may be used in the measurement of temperature by measurement of a thermal voltage generated therein which is a function of the difference in temperature between its hot junction (usually located at the place where the temperature is to be measured) and its cold junction (which may be remote from the hot junction and which is at a known temperature).

A disadvantage of using R-type thermocouples is that the materials are relatively expensive. When connection is made to a remotely located cold junction it is practical to use low cost compensating cables to carry the voltage signal to measurement electronics, but only if the temperature is less than 100° C. (beyond which such cables are unsuitable). At temperatures above this, which are common in aero engines, it is necessary to use thermocouple wires to carry the voltage signal to the necessary measurement electronics, (situated usually at a safe distance from the extreme temperatures to be measured). In such situations the thermocouple installation becomes unacceptably expensive.

One solution to the problem of cost is to place the cold junction in a mounting head of the thermocouple—a relatively short distance from the hot junction and for example located on the exterior of an aero engine—which might be at a much lower temperature, and to connect the head back to the measurement electronics using inexpensive copper wire. The temperature at the cold junction must then be measured in order to provide a "compensation temperature"—ie. the thermocouple's cold junction temperature which can be used, together with the derived voltage signal to calculate the temperature of the hot junction, since the thermally generated voltage in a thermocouple is a function of the difference in temperature between its hot and cold junctions. For measurement of the temperature at the cold junction a conventional K-type thermocouple, or else a resistance temperature detector (RTD), such as a Platinum resistance thermometer (PRT) may be used.

However, some applications require the measurement of an average temperature from a plurality of thermocouple probes. In an aero engine, for example, there may be, typically, 8 to 17 thermocouple probes each of which is likely to contain at least two thermocouples. Since, according to the above-mentioned arrangement, each measurement (R-type) thermocouple has a pair of (e.g. copper) wires from the thermocouple head to the measurement electronics and each head must have at least one (K-type) thermocouple for measurement of the cold junction temperature at the head, which itself has a pair of wires extending back to the measurement electronics, the number of connecting wires becomes substantial. In many applications space is at a premium and it is undesirable to have large bundles of wires conveying the appropriate signals from the thermocouple heads to the measurement electronics.

SUMMARY OF THE INVENTION

Accordingly, embodiments of the present invention aim to provide a system for cold junction compensation of multiple thermocouples in which the need for a large quantity of connecting wires is reduced.

The present invention is defined in the attached independent claims, to which reference should now be made. Preferred features may be found in the dependent claims.

Previous and future references in this text to a wire or wires are to be understood as references to a wired signal path. The skilled man would readily and instantly appreciate that a wire may consist of a multistrand wire or several wires connected in series whilst still remaining a single wire or wired signal path.

In one aspect, the invention provides a system for measuring average temperature comprising a plurality of thermocouples each being formed by a pair of thermocouple wires joined together at their first ends to form a hot junction with the other ends forming a cold junction connected to measurement apparatus, wherein the cold junctions of the thermocouples are connected to each other and to the apparatus by signal wire of a different material to that of the thermocouple wires in a manner such that only two wires connect the plurality of connected cold junctions to the measurement apparatus and a signal proportional to the average of the voltages generated by the thermocouples is supplied to the measurement apparatus and the device further comprises a plurality of further temperature sensitive devices one at each of said cold junctions, the further temperature sensitive devices being connected to each other and to the measurement apparatus in a manner such a signal proportional to the average of the signals generated by the further temperature sensitive devices is supplied to the measurement apparatus.

The present invention provides a device whereby one can simultaneously meet the apparently conflicting desiderata of keeping cost down and providing thermocouples able to withstand high operating temperature, whilst also significantly reducing the amount of wiring necessary to connect a number of thermocouples to measurement apparatus.

The invention enables the manufacture at less cost of a device suitable for measuring average temperature in a high temperature environment such as an aero engine and having connections to measurement apparatus or electronics which take up considerably less space in the, say aero engine, than the known devices.

The inventor of the subject invention is the first to appreciate that it is possible to obtain accurate average temperature measurements by determining a value representative of the average voltage generated by a number of thermocouples and compensating for the cold junction temperatures of these thermocouples by using a single compensation value representative of the average temperature of the different thermocouple cold junctions.

As discussed above, in this text and the claims to a wire or wires are to be understood as references to a wired signal path. The skilled man would readily and instantly appreciate that a wire may consist of a multistrand wire or several wires connected in series whilst still remaining a single wire or wired signal path.

The inventor is the first to appreciate that it is not necessary to individually and independently compensate for the cold junction temperature of each thermocouple and that not doing so allows one to significantly reduce the cost and number of required connection wires and still obtain an accurate measurement of average temperature.

BRIEF DESCRIPTION OF THE DRAWINGS

Preferred embodiments of the present invention will now be described by way of example only, with reference to the accompanying diagrammatic drawings in which.

DETAILED DISCUSSION OF PREFERRED EMBODIMENTS

Figure 1:
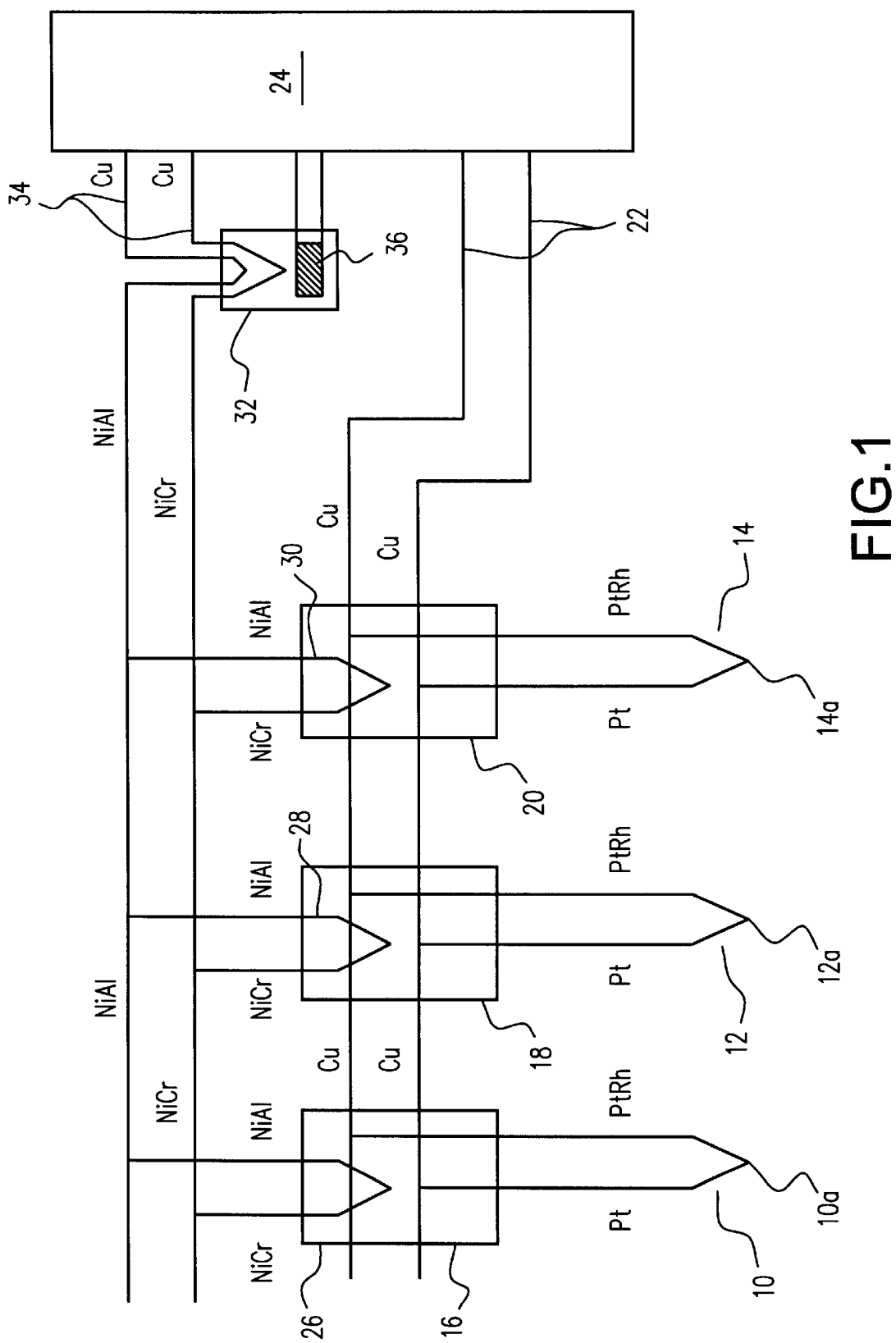
FIG. 1 shows, schematically, a system for providing cold junction compensation for a plurality of thermocouples, according to one embodiment of the present invention.

Referring to FIG. 1, this shows in schematic form a plurality of thermocouples 10, 12, 14 of Platinum/Platinum-Rhodium material. In use these thermocouples are housed in probes, either individually or else in pairs and are mounted for example in aero engines, such that the respective tips 10a, 12a, 14a will constitute hot junctions (or hot thermojunctions) located inside the gas stream in the engine to measure the average total gas temperatures in the engine which might typically be of the order of 1200° C. to 1600° C. At the other ends (the cold junctions—cold thermojunctions) the thermocouple wires are terminated in terminal heads 16, 18 and 20 mounted on the exterior of the engine at a much lower temperature which might typically be of the order of 300° C. to 400° C. The thermocouples 10, 12, 14 are connected in parallel to copper wires 22 which extend to conventional analytical circuitry, represented by 24. The voltage across the copper wires 22 is generated thermally, as a result of a difference in temperatures between the tips and the heads, i.e. the hot junctions and cold junctions, of the thermocouples and is an average of the thermal voltage generated by the three thermocouples 10, 12, 14.

Knowing this voltage, which is measured by the analytical electronics 24, and knowing the temperature of the cold junctions located in the heads where the platinum,(Pt) or platinum/rhodium PtRh wires are connected to the copper wires, permits calculation of the average temperature at the tips.

To measure the average value of the temperature at the cold junctions—i.e. in the heads 16, 18 and 20, a second set of thermocouples is used, each thermocouple 26, 28, 30 being housed in the respective head 16, 18 and 20 as close as possible to the cold junctions between the Pt or PtRh and the Cu wire. This second set of thermocouples are connected in parallel by means of a harness (not shown) to one pair of NiCr and NiAl wires. Because the heads are mounted on the outside of the engine, and are therefore at much lower temperatures, the thermocouples 26, 28, 30 may be of K-type having wires of NiCr and NiAl which are much less expensive than the high temperature R-type thermocouples used inside the engine.

Because the K-type materials are less expensive they can be used to convey the signal back towards the analytical electronics 24. However, before connecting to the electronics 24 the NiAl and NiCr wires are connected to Cu wires at what becomes the cold junction 32 of the K-type thermocouples.

In order to know the average temperature of the cold junctions of the R-type thermocouples 10, 12, 14—ie. the temperatures in the heads 16, 18, 20—it is necessary to know the thermally generated voltage across the return wires 34 from the K-type thermocouples, as well as the temperature at cold junction 32. The voltage is measured conventionally by the electronics 24. The cold junction 32 temperature may be measured for example by a conventional temperature measurement device such as a Platinum resistance thermometer 36.

Therefore the K-type thermocouples accurately measure the average temperature in the heads which is the average cold junction temperature of the R-type thermocouples 10, 12, 14. The potential across wires 22 is a function of the difference in temperature between the hot (or thermo-) and cold junctions of the R-type thermocouples and so it is possible to obtain an accurate measurement of the average temperature at the tips of the R-type thermocouples—i.e. an average value for the total gas temperatures inside the aero engine.

Moreover, this is achieved without having to use expensive platinum (Pt) and platinum/rhodium (PtRh) materials to carry the signal back to the analytical electronics. Furthermore, only two wires 22 are necessary to convey the average voltage signal from the R-type thermocouples to the electronics 24 and only two further wires 34 are needed to convey the average voltage signal from the K-type thermocouples to the electronics 24. Thus, cold junction compensation is provided without extensive use of costly materials and without the large numbers of bulky wires required by prior art arrangements.

Figure 2:
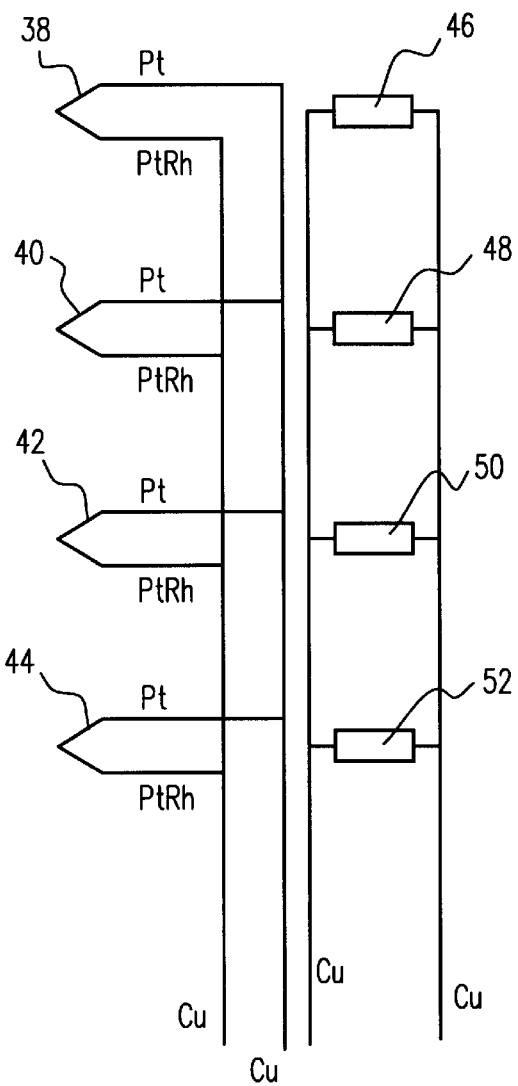
FIG. 2 shows an alternative embodiment of the present invention.

FIG. 2 shows an alternative embodiment, again in schematic form. Some labelling of the wires, and the analytical electronics, has been omitted from this diagram, for reasons of clarity.

Four R-type thermocouples 38, 40, 42, 44 are shown, but instead of K-type thermocouples this embodiment uses simple resistance temperature detector (RTD) elements 46, 48, 50, 52 to measure the average cold junction temperature of the R-type thermocouples. The RTDs may comprise platinum resistance thermometers. They are connected in parallel, with each RTD being located in close proximity to its respective cold junction.

Figure 3:
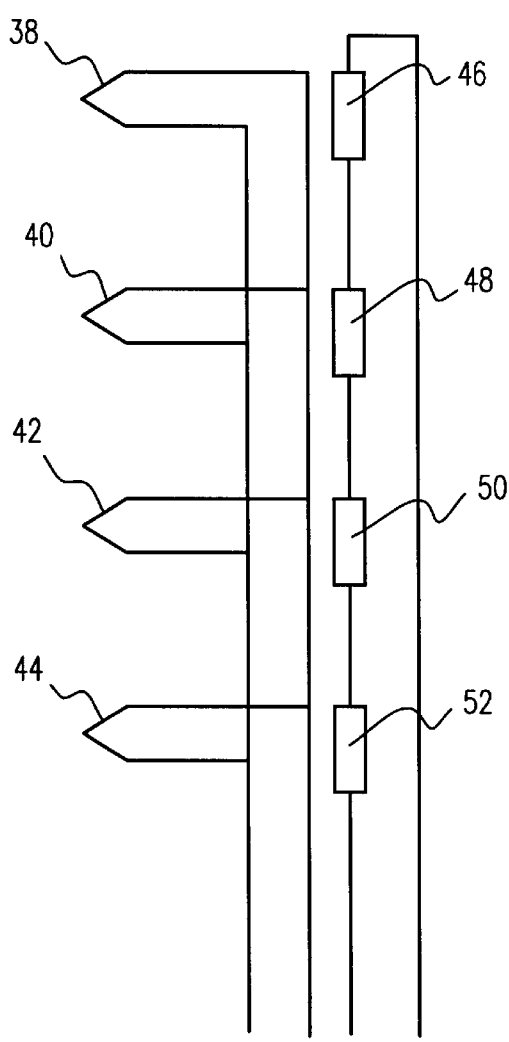
FIG. 3 shows a further alternative embodiment.

FIG. 3 shows yet another variant in which the RTDs are used as in FIG. 2, but this time they are connected in series.

Being connected in series, the signals produced by the RTDs are added rather than averaged (as when they are connected in parallel). The total is however proportional to the average and as the total number of RTDs in any situation will be known the average signal can be readily calculated.

Computer modelling of the arrangements described above has shown that the average hot junction (hot thermojunction) temperatures may be measured with a high degree of accuracy.

What is claimed is:

1. A system for measuring average temperature comprising:
   a plurality of thermocouples each thermocouple being formed by a pair of dissimilar thermocouple wires, each wire having first and second ends, each of said wire pairs joined together at said first ends to form a plurality of hot junctions, two signal wires comprised of a material different from the thermocouple wires, one of said signal wires connected to the second end of one of said pair of dissimilar wires of each of said thermocouples and the other of said signal wires connected to the second end of the other of said pair of dissimilar wires of each of said thermocouples, each pair of second end connections comprising a cold junction, each of said signal wires connected to the measurement apparatus such that a signal proportional to the average of the voltages generated by the plurality of thermocouples is supplied to the measurement apparatus, and a plurality of further temperature sensitive devices one at each of said cold junctions, the further temperature sensitive devices being connected to each other and to the measurement apparatus such that a signal proportional to the average of the signals generated by the further temperature sensitive devices is supplied to the measurement apparatus.

2. A system according to claim 1 wherein the further temperature sensitive devices are connected to each other in parallel.

3. A system according to claim 1 wherein the further temperature sensitive devices are connected to each other in series.

4. A system according to claim 3 wherein the thermocouples are connected to each other in parallel.

5. A system according to claim 1 wherein the further temperature sensitive devices comprise resistance temperature detectors (RTDs).

6. A system according to claim 5 wherein the RTDs comprise platinum resistance thermometers (PRTs).

7. A system according to claim 1 wherein the thermocouples are constructed of one of Platinum and Platinum-Rhodium materials (some examples of which are known as R-type thermocouples).

8. A system according to claim 1 wherein the further temperature sensitive devices comprise compensation thermocouples.

9. A system according to claim 8 wherein the further temperature sensitive devices are one of thermocouples of K-type and thermocouples constructed of Nickel-Aluminium and Nickel-Chromium.

10. A system according to claim 1 wherein the signal wires connecting the plurality of thermocouples to each other and to the measurement apparatus are of copper.

11. A method of measuring the average temperature at the hot junctions of a plurality of thermocouples comprising:

determining the average voltage generated by the thermocouples by connecting the thermocouple cold junctions in parallel with each other and to a calculation apparatus using a signal wire of a different material to that of the thermocouple wires, determining the average signal generated by a plurality of temperature sensitive devices, one at each of said cold junctions, by connecting the temperature sensitive devices to each other and to the calculation apparatus in a manner such that a signal proportional to the average of the signals generated by the temperature sensitive devices is supplied to the calculation apparatus, and calculating the average temperature of the thermocouple hot junctions by adding the temperature difference represented by the average thermocouple voltage supplied to the calculation apparatus to the temperature represented by the average temperature sensitive devices signal supplied to the calculation apparatus.

* * * * *